3,410,897
PURIFICATION OF TEREPHTHALIC ACID
Motoo Shigeyasu, Kaiso-gun, Yasuo Shimakawa, Osaka, and Kenzo Kuihara, Kaiso-gun, Japan, assignors to Maruzen Oil Company, Ltd., Osaka, Japan, a corporation of Japan
No Drawing. Filed Oct. 12, 1964, Ser. No. 403,333
Claims priority, application Japan, Oct. 10, 1963, 38/52,745
6 Claims. (Cl. 260—525)

This invention relates to the process for the purification of terephthalic acid involving the treatment thereof with potassium permanganate and ion exchange resin, and its object is to obtain pure white terephthalic acid of which purity is almost 100%.

Recently terephthalic acid has been used commercially as the raw material for polyester synthetic fibre and resin, and for this purpose pure white terephthalic acid with substantially 100% purity (hereinafter referred to as terephthalic acid for direct polymerization) is required as raw material in the case the synthetic polymer for such use is produced by polymerizing terephthalic acid with ethylene glycol directly.

However, terephthalic acid produced in large quantities industrially at present by oxidizing a dialkyl benzene with nitric acid or air always contains about 2–3% of intermediate products of reaction, by-products and small quantity of metals used as catalyst, and consequently it is necessary to purify this in order to obtain the terephthalic acid for direct polymerization.

A greater part of the said impurities is generally intermediate products of reaction, aldehyde, and it is very difficult to remove them. At the same time it is also difficult to remove 4,6-dicarboxy fluorenon and other substance whose structure is unknown, and which causes coloration of terephthalic acid.

Consequently, various purification processes have been heretofore proposed which involve potassium permanganate treatment. These processes comprise oxidizing with potassium permanganate the alkaline solution of terephthalic acid salts and thereafter, treating it with activated carbon.

The object of activated carbon treatment is, however, removal of substances which cause coloration only and also, as its mechanism is simply an adsorption phenomenon, its regeneration is difficult. Furthermore, there are difficulties in its operation.

In contrast to the foregoing, we discover that the terephthalic acid better suited for direct polymerization than that obtained by the aforementioned prior art processes can be obtained if ion exchange resin is used instead of activated carbon after first adjusting the pH of the alkaline solution of salts of terephthalic acid to 6.0–8.0 before treatment with potassium permanganate since in this manner ionic subtances and also managanous dioxide formed by decomposition of potassium permanganate are readily removed, regeneration of the ion exchanger and operation of the overall process are easy.

That is, the essence of this invention is a process for the purification of terephthalic acid which comprises dissolving the crude terephthalic acid obtained by oxidation of a dialkylbenzene in an aqueous alkaline solution, regulating its pH 6.0–8.0 by adding acid to the solution, oxidizing it by adding potassium permanganate and thereafter, treating it with an ion exchange resin.

Next, the details of this invention are described. As to the alkaline solution to dissolve the crude terephthalic acid, caustic soda or aqueous ammonia solution is appropriate. In case caustic soda is used, about 1.4 l. of 1.5–1.9 N caustic soda solution are added per mole of crude terephthalic acid, and in case aqueous ammonia solution, 130 g. of 28% ammonia solution per mole of crude terephthalic acid is preferably added. As a general rule, mineral acid or terephthalic acid is used for adjusting a pH of alkaline solution of terephthalic acid and for this purpose, hydrochloric acid is desirable as the mineral acid and in case terephthalic acid is used, it is desirable to use that of a purity not lower, desirably above and preferably higher than the raw material terephthalic acid to be purified. Preferably terephthalic acid product obtained from a previous purification according to this invention is used for pH adjustment. It is necessary for the pH of the alkaline solution of terephthalic acid to be 6.0–8.0. The effect is greater if potassium permanganate treatment is carried out on the acidic side but terephthalic acid begins to precipitate at pH below 6.0. The suitable quantity of potassium permanganate to be used is about 0.01–0.04 mole per mole of terephthalic acid. This addition to alkaline solution of terephthalic acid may be made slowly in small portions or the entire quantity may be added all at once, and the treating temperature of 60–90° C. is adequate, as is a treating time of about 30–60 minutes. The excess of potassium permanganate used for oxidation treatment is completely decomposed by ion exchange resin. Either cationic exchange type of anionic exchange type may be used as the ion exchange resin but in consideration of the exchange capacity and purifying efficiency, strong alkali anionic exchange resin is generally used, of which a suitable amount to be used is usually 565 ml. per 1 mole terephthalic acid.

As the method for treating the solution, either the method of making the solution flow (percolate) through the ion exchange resin or the method of mixing with the ion exchange resin and shaking is satisfactory. Below 5 m./h. is suitable as the linear speed when making the solution flow through, preferably downward through, the ion exchange resin layer and when using slurrying of the ion exchange resin, a treating time of 30–60 minutes is appropriate. In both cases, room temperature is sufficient as the treating temperature.

Next, representative examples of this invention and comparative examples are described. The crude terephthalic acid used in said examples is that obtained by the liquid phase air oxidation of p-xylene. The composition of the crude terephthalic acid is as follows:

| | |
|---|---|
| Terephthalic acid | wt. percent__ 99.51 |
| Aldehydes | do____ 0.44 |
| Mono-basic acids | do____ 0.04 |
| Metals | do____ 0.004 |
| Volatile matter | do____ 0.006 |
| Acid number | do____ 672.8 |
| Color | Hazen No. 20 |

EXAMPLES 1 TO 5

The case when the method of making alkaline solution of terephthalic acid flow down through the ion exchange resin layer was carried out is shown in Table 1. The procedure for this is as follows:

First, 100 g. of crude terephthalic acid was dissolved using 0.85 liter of 1.5 N aqueous solution of caustic soda or 0.085 liter of 28% aqueous ammonia solution and acid was added to this solution to adjust the pH.

Next, this solution was maintained for a fixed time in a thermostat after potassium permanganate was added to it and oxidized while stirring mechanically.

After oxidation, this solution was made to flow down from the top of a column of 4 cm. inner diameter and 40 cm. height filled with 340 ml. of strong alkali anionic exchange resin. Then, hydrochloric acid was added to the effluent to precipitate purified terephthalic acid.

The character of purified terephthalic acid and detailed application conditions are as shown in Table 1.

was made to flow down at normal temperature with the rate of 0.5 l./hr. from the top of the column (inner radius

TABLE 1

| No. of Example | Alkali | Acid Used for pH Adjustment | pH | Oxidation Condition | | | Ion Exchange Resin | Rate of Solution to be Flown |
|---|---|---|---|---|---|---|---|---|
| | | | | Amount of KMnO₄ (g.) | Temperature (° C.) | Time (min.) | | |
| 1 | NaOH | | 7.2 | 0.8 | 60 | 60 | I.R.A.-400 [1] | 0.5 |
| 2 | NaOH | HCl | 6.0 | 0.8 | 60 | 30 | I.R.A.-400 | 0.3 |
| 3 | NaOH | HCl | 7.2 | 3.2 | 80 | 60 | I.R.A.-400 | 3.0 |
| 4 | NH₄OH | | 7.2 | 0.8 | 60 | 60 | I.R.A.-400 | 0.3 |
| 5 | NaOH | HCl | 7.2 | 0.8 | 60 | 60 | X.E.-98 [2] | 0.3 |

[1] Amberlite I.R.A.-400—Quaternary strong base type (styrene) anion exchange resin manufactured by Rohm and Haas Co., Philadelphia, Pennsylvania.
[2] Amberlite X.E.-98—Anion exchange resin manufactured by Rohm and Haas Co.
Amberlite is a registered trademark of Rohm and Haas Co.

| No. of Example | Terephthalic Acid | | | |
|---|---|---|---|---|
| | Yield (percent) | Purity (percent) | Color (Hazen No.) | Aldehydes (percent) |
| 1 | 98.0 | 99.99 | 0 | <0.01 |
| 2 | 98.0 | 99.99 | 0 | <0.01 |
| 3 | 99.0 | 99.98 | <5 | <0.01 |
| 4 | 98.0 | 99.99 | 0 | <0.01 |
| 5 | 98.0 | 99.98 | <5 | <0.01 |

EXAMPLES 6 TO 8

Next, the case of treatment of mixing ion exchange resin with aqueous alkali solution of terephthalic acid is shown in Table 2. The procedure of this case is as follows:

Similar to the above application example, after pH of the aqueous alkali solution of terephthalic acid was adjusted, the solution was oxidized with potassium permanganate, then placed in a 2 liter polyethylene reagent bottle together with the ion exchange resin and shaken at a rate of 180 times per minute for 60 minutes using a horizontal type shaker and then purified terephthalic acid was separated by adding hydrochloric acid to this solution.

The character of purified terephthalic acid and detailed application conditions are as shown in Table 2.

40 cm., height 40 cm.) filled with 340 ml. of 50–100 mesh active carbon.

The character and composition of the terephthalic acid which had been separated by adding hydrochloric acid to the effluent was as follows:

Terephthalic acid _____wt. percent__ 99.97
Aldehydes _____ <0.02
Color _____ Hazen No. 5.0
Yield _____percent__ 94.0

Next, the result of color determinations of the products when purified product of this invention and purified terephthalic acid obtained by the process of Comparative Example 2 were each polymerized with ethylene glycol are as follows:

Polymer from terephthalic acid obtained by
  the method of Comparative Example
  No. 2 _____ Hazen No. 90
Polymer from terephthalic acid obtained by
  the process of this invention _____ Hazen No. 60

As is clear from the above examples, trace quantities of aldehydes and substances which cause coloration were

TABLE 2

| No. of Example | Alkali | Acid used for pH Adjustment | pH | Oxidation Condition | | | Treatment of Ion Exchange Resin | | |
|---|---|---|---|---|---|---|---|---|---|
| | | | | Amount of KMnO₄ (g.) | Temperature (° C.) | Time (min.) | Ion Exchange Resin | Amount of Ion Exchange Resin (ml.) | Stirring Time (min.) |
| 6 | NaOH | HCl | 7.2 | 0.8 | 60 | 60 | I.R.A.-400 | *340 | 60 |
| 7 | NaOH | HCl | 7.2 | 0.8 | 60 | 60 | I.R.A.-400 | *1,360 | 60 |
| 8 | NH₄OH | HCl | 7.2 | 0.8 | 60 | 60 | X.E.-98 | 340 | 60 |

*Treated 4 times, each one run 340 ml.

| No. of Example | Terephthalic Acid | | | |
|---|---|---|---|---|
| | Yield (percent) | Purity (percent) | Color (Hazen No.) | Aldehydes (percent) |
| 6 | 99.0 | 99.98 | <5 | <0.01 |
| 7 | 98.0 | 99.99 | 0 | <0.01 |
| 8 | 98.0 | 99.99 | 0 | <0.01 |

COMPARATIVE EXAMPLE 1

A process was carried out under the same conditions as in Example 2 except that pH adjustment of solution had not been done. Yield and analytical value of the terephthalic acid obtained was as follows:

Terephthalic acid _____wt. percent__ 99.95
Aldehydes _____do____ 0.04
Color _____ Hazen No. <5
Yield _____percent__ 97.0

COMPARATIVE EXAMPLE 2

The sample solution, oxidized by potassium permanganate under the same condition as in Example 2, was treated by active carbon. That is, the said sample solution completely removed by the method of this invention, by which terephthalic acid for direct polymerization which is superior to that by the previous processes can be obtained with good yield and it is also clear that this is an advantageous process from the industrial and economic viewpoints since continuous refining operation and regeneration of ion exchange resin are simple.

What is claimed is:

1. A process for the purification of terephthalic acid which comprises dissolving in an aqueous alkaline solution crude terephthalic acid obtained by the liquid phase air oxidation of a paraxylene, regulating the pH of said solution to a pH in the range of from 6.0 to 8.0 by adding acid to the solution, oxidizing said pH adjusted solution by adding potassium permanganate thereto, treating it with an ion exchange resin, and recovering said acid by adding an acid to said solution.

2. The process of claim 1 wherein said aqueous alkaline solution is 1.5–1.9 N sodium hydroxide and there is used 1.4 to 1.5 liters thereof per mole of terephthalic acid.

3. The process of claim 1 wherein said aqueous alkaline solution is a 28% solution of ammonia and 130 grams thereof per mole of terephthalic acid is used.

4. The process of claim 1 wherein 0.01 to 0.04 mole of potassium permanganate per mole of terephthalic acid is used.

5. The process of claim 1 wherein a mineral acid is used for said pH adjustment.

6. The process of claim 1 wherein terephthalic acid of a purity not below that being purified is used for said pH adjustment.

References Cited

UNITED STATES PATENTS

| 2,899,466 | 3/1957 | O'Neill et al. | 260—525 |
| 3,047,621 | 7/1962 | Tate | 260—525 |

FOREIGN PATENTS 788,276 12/1957 Great Britain.

HENRY R. JILES, *Primary Examiner.*